March 25, 1969 KATSURO NAKAMURA 3,435,439

WOVEN TYPE, MAGNETIC MEMORY DEVICE EMPLOYING SHIELDING TERMINAL PLATES

Filed June 10, 1966 Sheet 1 of 5

INVENTOR.

KATSURO NAKAMURA

BY

H. Edward Masters

INVENTOR.
KATSURO NAKAMURA
BY
H. Edward Mestern

INVENTOR.
KATSURO NAKAMURA
BY
H. Edward Mestern

INVENTOR.
KATSURO NAKAMURA
BY
H. Edward Nestern

INVENTOR.
KATSURO NAKAMURA
BY
H. Edward Mestern

United States Patent Office 3,435,439

Patented Mar. 25, 1969

3,435,439

WOVEN TYPE, MAGNETIC MEMORY DEVICE EMPLOYING SHIELDING TERMINAL PLATES

Katsuro Nakamura, Tokyo-to, Japan, assignor to Toko Kabushiki Kaisha, Tokyo-to, Japan, a joint-stock company of Japan Filed June 10, 1966, Ser. No. 556,773
Claims priority, application Japan, July 17, 1965, 40/43,103
Int. Cl. G11b *5/12*
U.S. Cl. 340—174 1 Claim This invention relates to woven type, magnetic memory devices and more particularly to a new and improved woven type, magnetic memory device in which magnetic thin film wire is used.

It is a prime object of the present invention to reduce noise in woven type, magnetic memory devices by simultaneously solving two problems causing noise as will be described in detail hereinafter.

According to the present invention, briefly stated, there is provided a woven type, magnetic memory device of the type described more fully hereinafter in which the ends of adjacent pairs of conductor wires are commonly connected to respective terminals for internal wiring connections of a supporting base plate to form word lines each consisting of coils with a selected number of turns, characterised by shielding conductor plates covering parts of the base plate at and in the neighbourhood of the terminals for internal wiring connections and electrically connected to a ground (earth) plate bonded onto the base plate.

The nature, principle, and details of the invention will be more clearly apparent from the following detailed description when read in conjunction with the accompanying drawings, throughout which like parts are designated by like reference numerals and characters.

Figure 6:
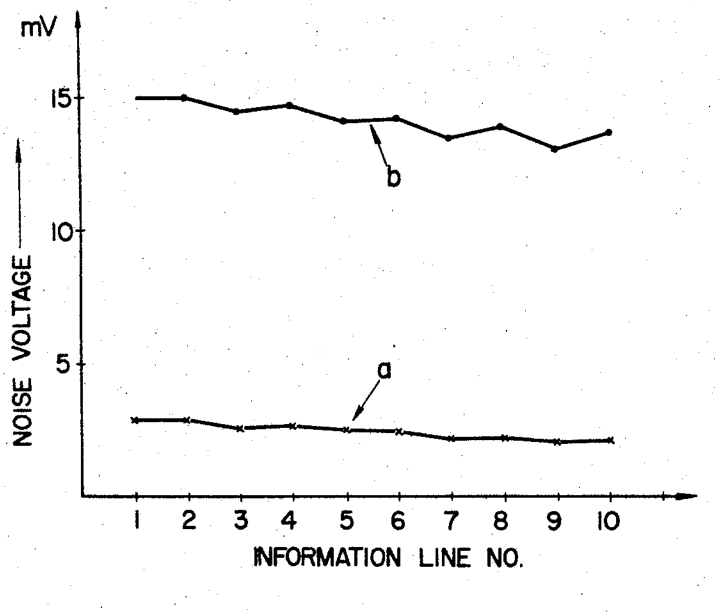

FIGS. 5(*a*), 5(*b*) and 5(*c*) are perspective views, and FIG. 5(*d*) is a plan view, showing examples of conductor plates for shielding; and FIG. 6 is a graphical representation indicating the results in terms of noise voltage of a comparative test performed on a memory device of the invention and a known memory device.

Figure 1:
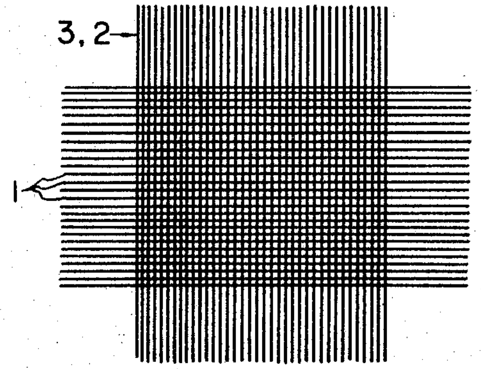
FIG. 1 is a simplified planar view showing the general woven state of a woven type, magnetic memory device.
Figure 2:
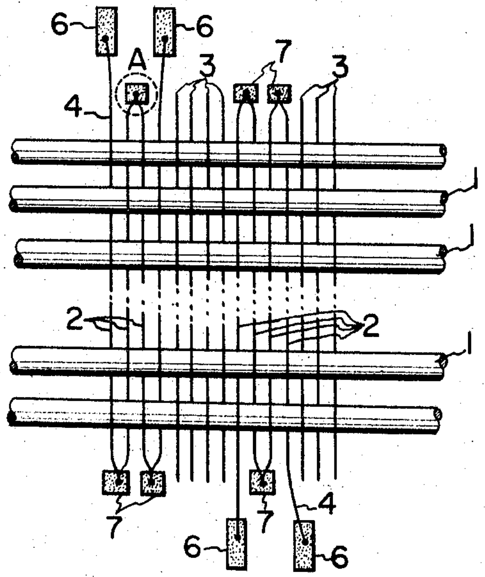
FIG. 2 is a relatively enlarged planar view showing one example of the manner in which word lines are connected.

In a memory device of the type with which the present invention is concerned, a large number of magnetic thin film wires 1 (hereinafter referred to simply as "magnetic wires") consisting of thin conductor core wire coated with ferromagnetic thin film are woven as weft members with a large number of insulated conductor wires 2 and spacer wires 3 as warp members into a fabric structure as indicated in FIG. 1. Then, as shown in FIG. 2, the ends of warp conductor wires 2 are connected to form several coils 4 each of any selected number of turns. In the example illustrated in FIG. 2, each coil 4 has two turns formed by four warp conductor wires.

According to general practice, the magnetization easy axis of each magnetic wire 1 is caused to be in the wire circumferential direction, and each magnetic wire 1 is used as an information line (functioning doubly as a digit line and a sense output line), while each coil 4 is used as a word line.

While it is possible also to cause easy axis of each magnetic wire to be in the wire axial direction and to use each coil 4 and magnetic wire 1 as information and word lines, respectively, the following description is presented, for the sake of simplicity, with respect to the general case wherein each coil 4 is used as a word line.

Figure 3:
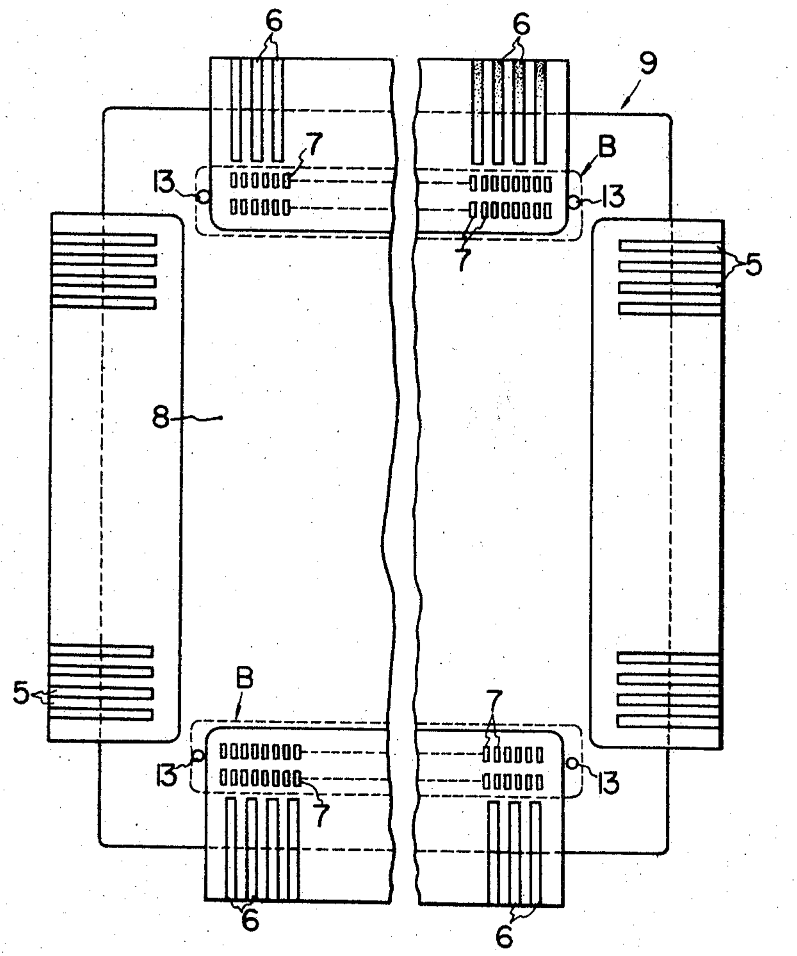
FIG. 3 is a planar view, with a part cut away for contraction, showing a supporting base plate.

To obtain the connections as indicated in FIG. 2 in actual practice, the fabric structure as shown in FIG. 1 is mounted on a supporting base plate 9 made of an insulating material as shown in FIG. 3 having lead-out terminals 5 for information lines and lead-out terminals 6 for word lines at its periphery and terminals 7 for internal wiring connections and having on its central surface a ground (earth) plate 8 functioning doubly as a common return line for the information lines and a shield. Then, as shown in FIG. 4, the ends of adjacent pairs of conductors 2 are connected to terminals 7 for internal wiring connections, and the terminal ends of the conductors 2 are connected to lead-out terminals 6.

Figure 4:
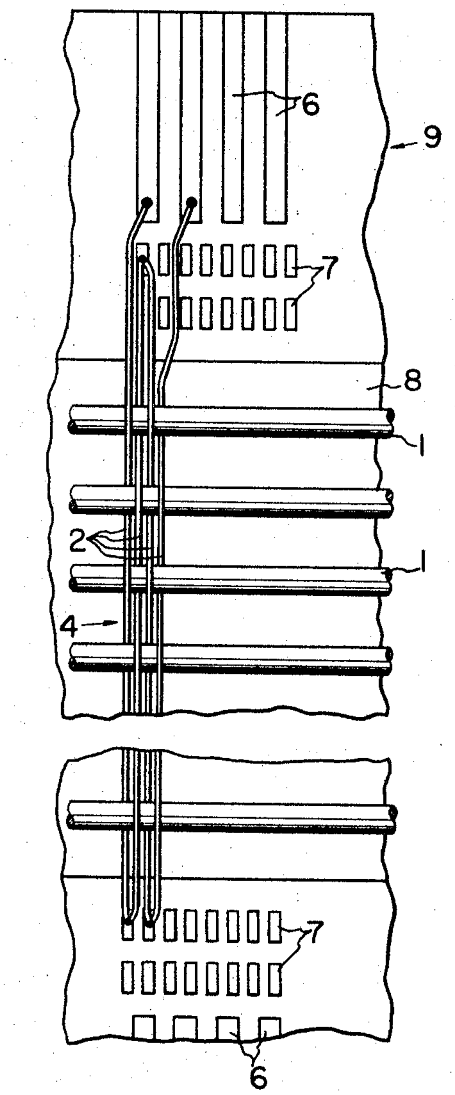
FIG. 4 is a fragmentary, relatively enlarged planar view showing the state of word lines mounted on the supporting base plate.
Figure 5A:
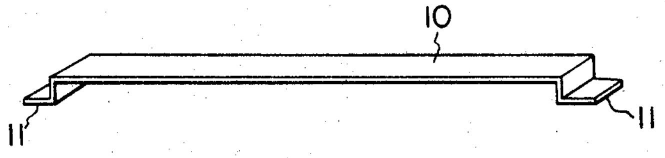
Figure 5B:
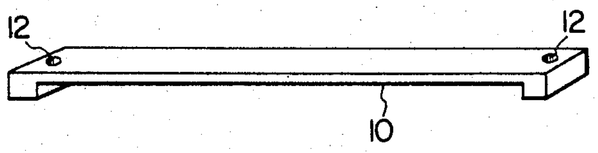
Figure 5C:
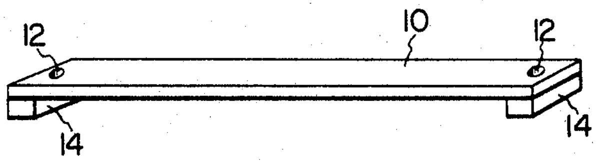
Figure 5D:
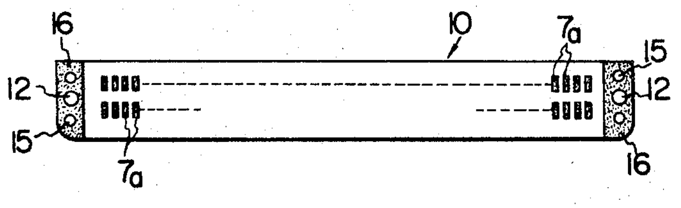

While only one word line group is shown in FIG. 4, a large number of similar groups are alternately arranged with opposite upper and lower connections.

A memory device of the above described composition and arrangement, however, has the disadvantage of substantial noise mixed with the output.

As a result of an investigation of the cause of this noise, I have been able to determine the following two problems which give rise to this noise.

(1) Although the word lines are disposed in an orderly geometrical arrangement in the central part of the fabric structure, they become irregularly arranged at parts near the outer periphery of the fabric structure because of the wiring connections. The electromagnetic lines of force emanating from these parts are irregularly coupled with the near information lines and thereby constitute a cause of noise.

In this respect, the effect due to a loop such as that designated by enclosure A in FIG. 2 is especially pronounced.

(2) Since the ground (earth) plate 8 does not extend through the parts where the terminals 7 for internal wiring connections are positioned, abrupt variations in ground (earth) potential readily occur at these parts, and these variations readily induce noise in the neighbouring information lines.

It is, therefore, a specific object of the present invention to solve these two problems simultaneously.

To this end, according to the present invention, the word lines are first connected to the terminals 7 for internal wiring connections, and then shielding conductor plates 10 as shown FIG. 5 are placed over the parts of internal wiring connections as designated by enclosures B in FIG. 3 and electrically connected to the ground plate 8.

By thus shielding the internal wiring connections of the word lines, the electromagnetic lines of force emanating from these parts are prevented from coupling with the information lines. Therefore, the above described problem 1 is solved. Moreover, the electrical connection of the shielding conductor plates 10 to the ground plate 8 has the same effect as actually extending the ground plate 8 through the parts B of the internal wiring connections. Therefore, abrupt variation in ground potential in these parts is eliminated, and, accordingly, the above described problem 2 is simultaneously solved.

The shield conductor plates 10 according to the invention will now be described with respect to examples thereof as illustrated in FIG. 5.

The example shown in FIG. 5(*a*) is formed from a single metal sheet by bending the ends to raise the main part and to form end mounting plates 11, which are brazed onto the ground plate 8.

FIG. 5(*b*) illustrates another example of the shielding conductor plate 10 which is a metal plate having downwardly directed projections formed at its ends and provided with mounting holes 12 through which fasteners such as screws, rivets, or hollow rivets are passed and secured to fasten the shielding conductor plate to the supporting base plate 9. In this case, corresponding mounting holes 13 must also be provided in the supporting base plate 9 as shown in FIG. 3.

The main part of each of these shielding conductor plates is raised so as to prevent it from contacting and causing short circuits with the internal wiring. If necessary, the reverse surface (lower surface) of the plate may be insulated.

In another example as shown in FIG. 5(*c*), metal base blocks 14 are provided below the two ends parts of the shielding conductor plate 10. In this case, the main structure of the shield plate 10 may be made of an insulator plate with a metal foil or metal layer 17 bonded onto only its reverse surface. In any case, the conductor part of the shield plate 10 can be electrically connected by way of the metal base blocks 14 to the ground plate 8.

While in the above described examples, each internal wiring connection part is covered over its entire area by a single conductor plate, only a certain portion of the part may be so shielded in some cases. In some cases, furthermore, the word lines may be divided into groups, each group being shielded independently.

In a special example of the shielding conductor plate as shown in FIG. 5(*d*), use is made of a printed wiring plate made of an insulating material in which the internal wiring connections are made by groups. A shielding conductor is bonded onto the reverse side of this printed wiring plate, and on the front side there are printed terminals 7*a* for internal wiring connections and conductors 16 at the two ends electrically connected by way of connecting holes 15 to the shielding conductor on the reverse side.

More specifically, some of the word lines are wired to terminals 7 on the supporting base plate, and this printed wiring plate is placed over these internal wiring connections. The remaining word lines are wired to terminals 7*a* for internal wiring connections on the front side, and over these connections a separate shielding conductor plate is placed, its two ends being electrically connected to the conductors 16. In this manner, it is possible to effect internal wiring of the word lines divided into two tiers or three tiers and to shield each tier separately.

In addition, metal foil with a reverse side treated to render it insulative may be used for the shielding conductor plate 10.

FIG. 6 indicates the results of actual measurements of noise voltages generated in an information line when a drive current is passed through a word line. The numbers on the abscissa respectively designate the numbers of the information lines of the fabric structure beginning with the outermost information line. The noise voltage measured in the case of the memory device of the present invention are indicated by curve *a*, and those measured in the case of a known memory device are indicated by curve *b*.

The two sets of noise voltage values were measured under exactly the same conditions such as waveform of drive current passed through the word line, magnitude of current, and method of detecting the output.

As indicated by the two curves *a* and *b*, it is clearly apparent that by the practice of the present invention, the noise voltages are reduced to approximately ⅕ of those produced in the known memory device.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claim.

What I claim is:

1. In a woven type memory device of the type wherein numerous magnetic thin film wires used as information lines are woven as weft members with numerous warp members consisting of conductor wires used as word lines into a fabric structure, and the ends of adjacent pairs of warp conductor wires are commonly connected to respective terminals for internal wiring connections on a supporting base plate to form word lines each consisting of coils with a selected number of turns, means to reduce noise in the information lines comprising shielding conductor plates covering parts of the base plate at and in the neighbourhood of said terminals and electrically connected to a ground plate bonded onto the base plate.

References Cited

UNITED STATES PATENTS

| | | | |
|---|---|---|---|
| 2,468,737 | 5/1949 | Davis | 339—143 |
| 2,717,366 | 9/1955 | Summerer | 174—35 |
| 3,322,885 | 5/1967 | May et al. | 339—143 |

FOREIGN PATENTS

| | | |
|---|---|---|
| 205,183 | 1/1956 | Australia. |
| 1,071,157 | 12/1959 | Germany. |

STANLEY M. URYNOWICZ, Jr., *Primary Examiner.*

U.S. Cl. X.R.

174—35; 339—143